No. 625,694. Patented May 23, 1899.
J. N. McCUNE & J. DAVIS.
PLOW.
(Application filed Mar. 24, 1898.)
(No Model.)
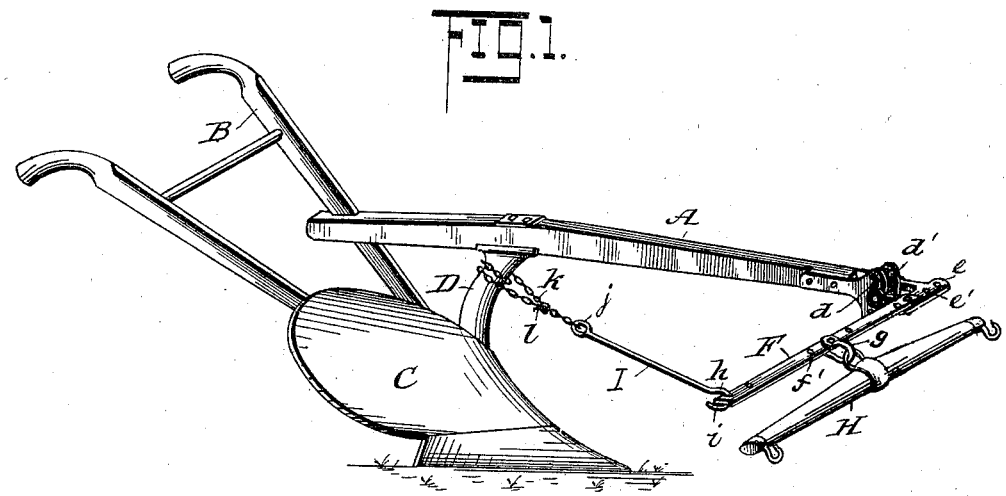
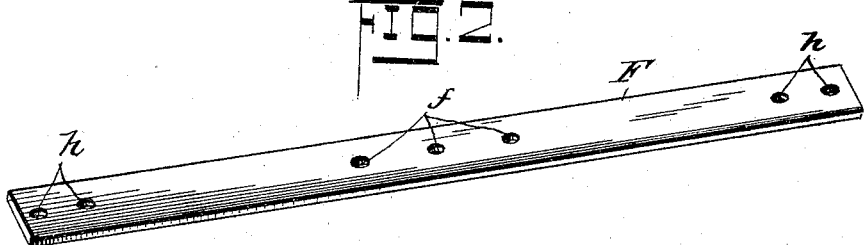
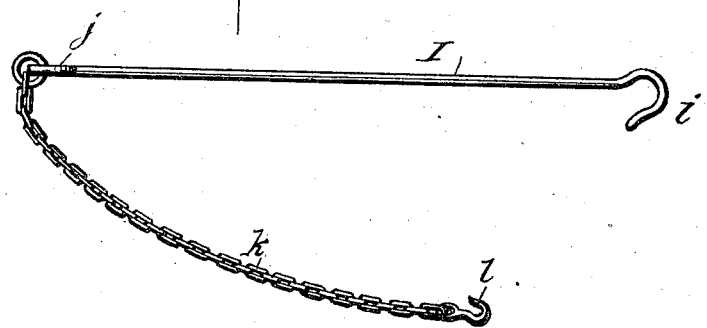
Witnesses:
Saml R. Turner
C. C. Hines
Inventors
Jasper P. McCune
John Davis.
By Lacey, Attorneys.

UNITED STATES PATENT OFFICE.

JASPER N. McCUNE AND JOHN DAVIS, OF CAMP VERDE, ARIZONA TERRITORY.

PLOW.

SPECIFICATION forming part of Letters Patent No. 625,694, dated May 23, 1899.

Application filed March 24, 1898. Serial No. 675,032. (No model.)

*To all whom it may concern:*

Be it known that we, JASPER N. MCCUNE and JOHN DAVIS, citizens of the United States, residing at Camp Verde, in the county of Yavapai, Territory of Arizona, have invented certain new and useful Improvements in Plows; and we do hereby declare the following to be a full, clear, and exact description of the invention, such as will enable others skilled in the art to which it appertains to make and use the same.

This invention relates to improvements in plows, and particularly to draft attachments therefor; and the object is to provide a simple, durable, and efficient side-draft attachment, by means of which the draft-animals may be hitched up at either side of the beam, so as to permit of a furrow being made close to obstructions, and the dirt thrown toward or from the same, as desired, said attachment being capable of adjustment endwise or transversely of the beam and also reversible, so that it may be readily and quickly swung around on its securing-bolt from one side of the beam to the other.

To this end the invention consists of certain novel features of construction, combination, and arrangement of parts, which will be hereinafter more fully described, and particularly pointed out in the appended claim, reference being had to the accompanying drawings, forming a part of this specification, and in which—

Figure 1 is a perspective view of a plow embodying our invention. Fig. 2 is a perspective view of the draft-bar. Fig. 3 is a detail view of the guy-rod and connecting-chain on an enlarged scale.

Referring now more particularly to the drawings, A represents the beam of the plow; B, the stilts or handles; C, the plowshare, and D the standard connecting the same to the beam, said parts being of the usual or any approved construction.

In carrying out our invention we provide the beam at its forward end with a pair of clevises $d\,d'$, secured to opposite sides thereof and provided with alined series of openings, whereby the draft attachment may be adjusted vertically to secure varying heights of draft. Connected to these clevises by means of a transverse bolt passed through a pair of rearwardly-projecting arms thereon, which arms straddle the clevises, is an adjustable link-plate provided with a series of openings $e'$. This link-plate extends transversely beyond the sides of the beam and projects forwardly a sufficient distance from the clevises to allow the adjacent pivoted end of the draft-bar to swing freely without interfering with said clevises in reversing the draft-bar from one side of the beam to the other.

F represents the draft-bar, which consists of a flat metal rod or plate provided centrally with a series of openings $f'$, by means of which the singletree-clevis $g$ may be adjustably connected therewith, and at each end with two or more openings $h$, as shown. This bar is connected at one end to the link-plate by one or more bolts passed through the openings therein and coincident openings in said link-plate. When it is desired to allow the bar freedom to swing back and forth in a direction longitudinally of the beam, a single bolt may be employed to serve as a permanent pivot connection; but if it is desired to hold the bar in fixed relation to the beam an additional bolt may be employed to prevent any pivotal movement after the bar has been primarily adjusted for use. The singletree H is connected in the usual manner to the clevis $g$ by means of a hook or an eye thereon, and by this construction it will be seen that the singletree is arranged wholly at one side of the beam, so as to permit of the draft-animal being hitched up at that side, thereby enabling the opposite side of the plow to be run close up to trees, fences, and other obstructions in plowing. The outer end of the draft-bar is stayed by means of a guy-rod provided at one end with a hook $i$, adapted to engage either one of the openings $h$, and at its outer end with an eye $j$, to which one end of a link chain $k$ is connected, the said chain being provided at its free end with a hook $l$. The chain is passed around the standard D to draw upon the guy-rod and maintain the draft-bar at right angles to the beam when pulling strain falls thereon, and said chain is secured by engaging the hook $z$ with one of its links, as shown in Fig. 1. By employing a link-chain connection thus constructed any slack due to looseness or elongation of the parts through wear may be readily taken up and the bar maintained at a right angle to the beam, and at the same time the chain readily permits of the guy-rod being moved from one side to the other under the beam to engage the bar whenever its position is reversed.

In Fig. 1 the draft-bar is shown projecting laterally from the beam on the moldboard side of the share, so that the land side of said share may be run close up to trees, fences, and other obstructions to form a furrow and throw the dirt outwardly therefrom. It will be understood, however, that the position of the draft-bar may be reversed—that is to say, it may be arranged to project laterally on the land side, so that the moldboard side of the plow may be run close up to obstructions about which it is desired to throw the dirt. This may be readily and quickly accomplished by simply releasing the hook end of the guy-rod, swinging the draft-rod around on its securing-bolt, and again connecting the guy-rod therewith, and the operator is thereby relieved of all additional labor attendant upon completely detaching the bar and attaching the opposite end thereof to the link-plate or carrying the bar around to the opposite side of the beam and again attaching it to the plate. It will be observed that the convenient mode of reversing the draft-bar is obtained by constructing the bar and arranging the chain and guy-rod connection in the specific manner described and by providing a link-plate for the attachment of the draft-bar in advance of the clevises, so that said bar may swing around without interference.

From the foregoing description, taken in connection with the accompanying drawings, the construction and operation of our invention will be readily understood, and it will be seen that it provides a simple and effective draft attachment which may be adjusted and readily and conveniently attached and detached to apply it to either side of the plow. The important advantage also resulting from our construction is that the line of draft is not varied and there is no tendency of the plow to be deflected or run sidewise, but a straight and true furrow is turned.

It will be understood that the plow may be conveniently employed in excavating for roads and ditches, as the draft attachment may be applied on the moldboard side of the share to enable the land side thereof to be run close to a perpendicular embankment to throw the dirt outwardly therefrom.

Having thus described our invention, what we claim as new, and desire to secure by Letters Patent, is—

In a side-draft attachment for plows, the combination, with a plow-beam and standard, of a pair of clevises projecting forwardly from the front end of the beam and secured on opposite sides thereof, a transverse link-plate arranged in advance of the clevises and having rearwardly-projecting arms straddling said clevises and adjustably secured thereto, a draft bar or rod having one of its ends resting on the link-plate and pivotally connected thereto so that the bar may be swung around on its pivot to project laterally from either side of the beam, a singletree connection adjustably secured to the central portion of the bar, and a reversible, laterally-swinging stay connection for the bar, comprising a guy-rod having a hook at its front end to engage the outer end of the bar, and a chain secured at one end to the rear end of the rod, passed around the standard of the plow and provided at its free end with a hook adapted to engage one of the links thereof, substantially as described.

In testimony whereof we affix our signatures in presence of two witnesses.

JASPER N. McCUNE.
JOHN DAVIS.

Witnesses:
L. M. OLDEN,
JAMES R. LAY.